UNITED STATES PATENT OFFICE.

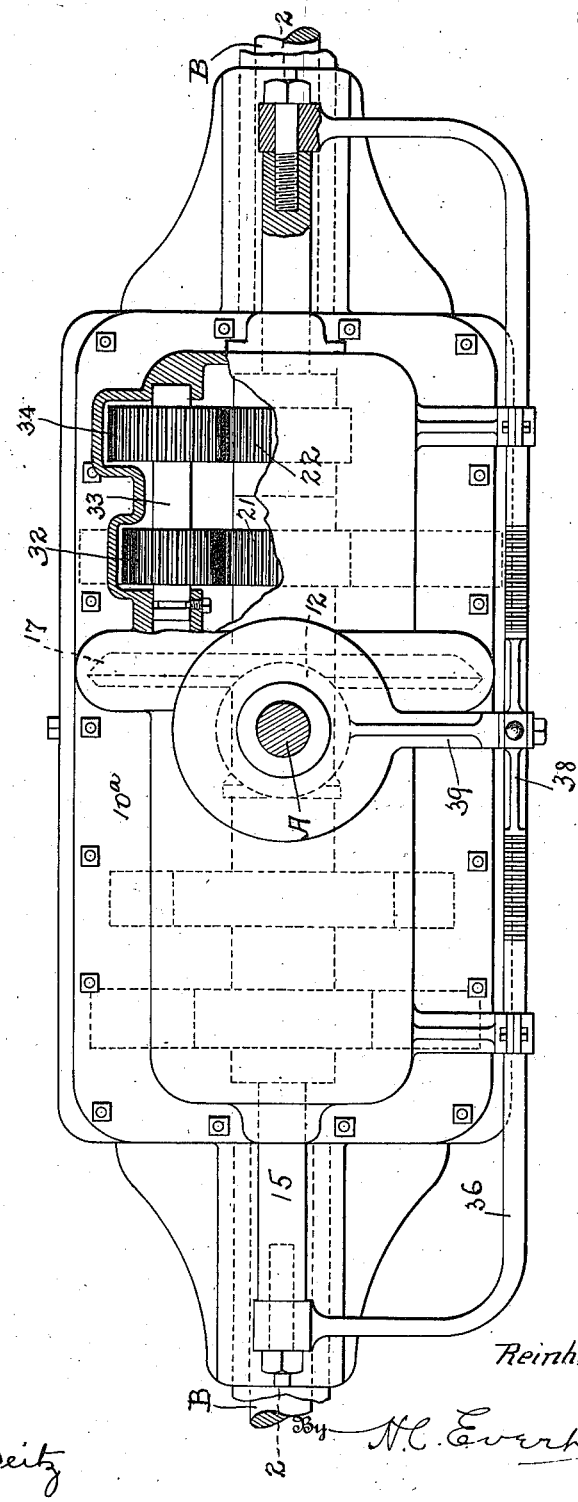

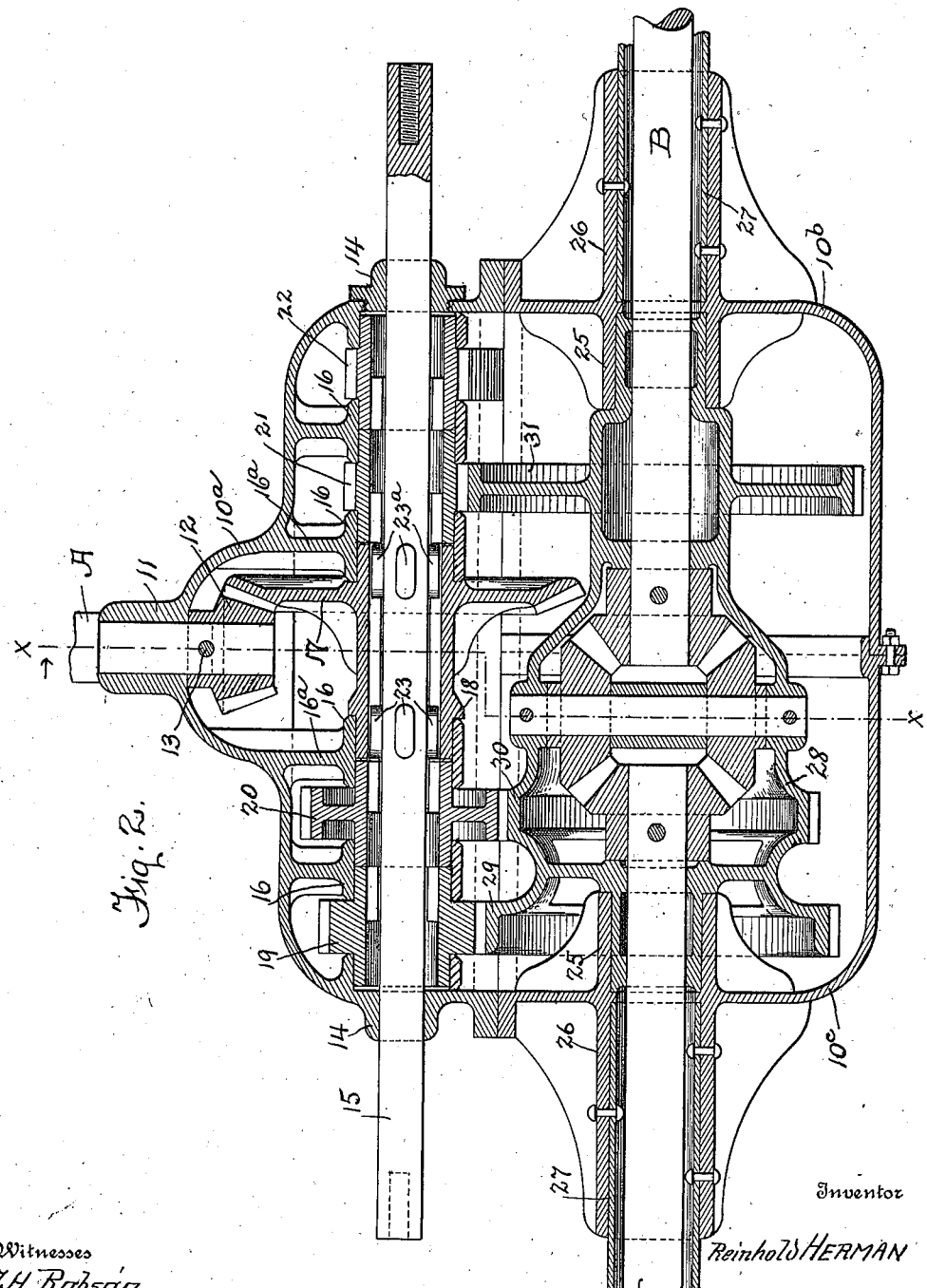

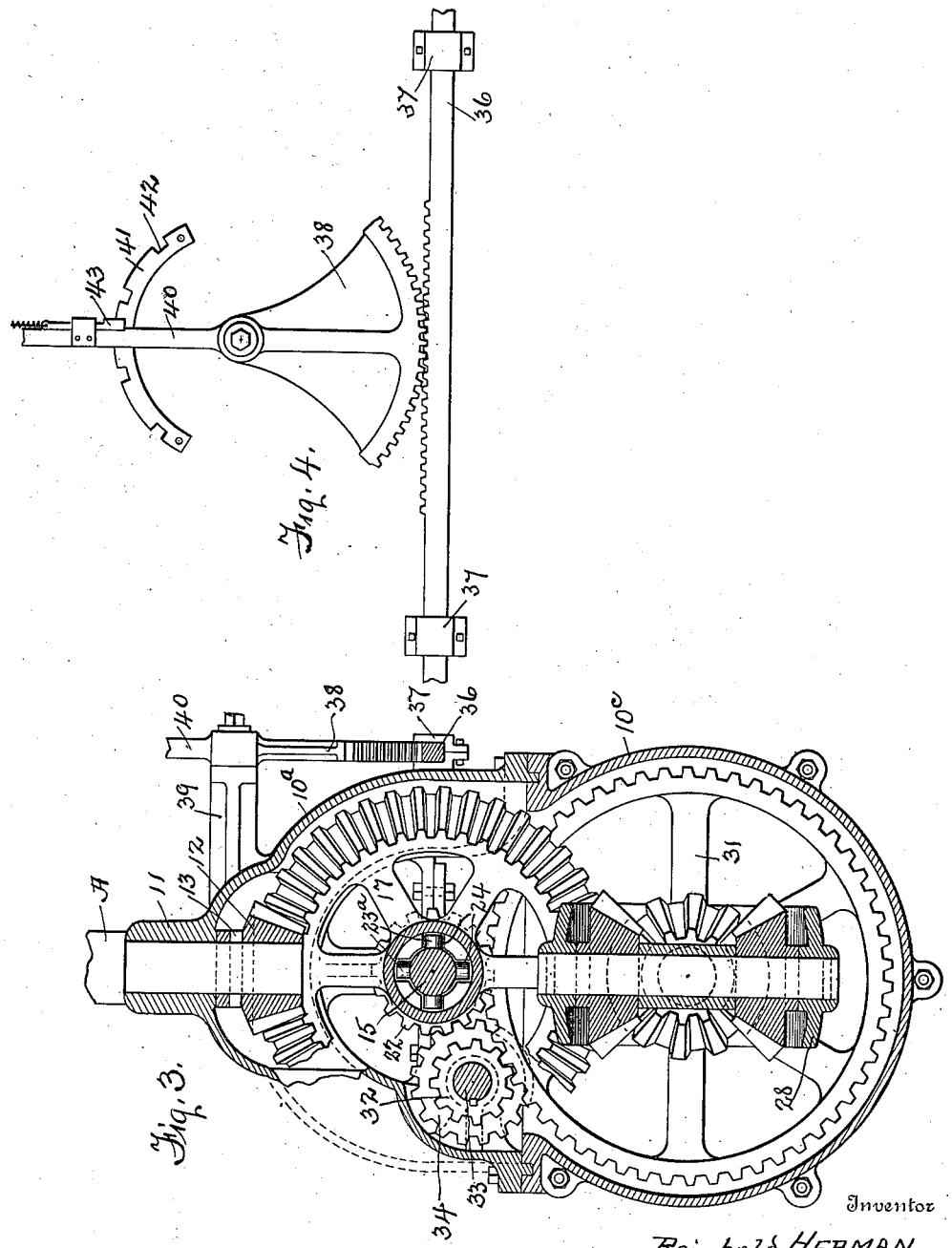

REINHOLD HERMAN, OF CRAFTON, PENNSYLVANIA.

TRANSMISSION MECHANISM.

977,871.  Specification of Letters Patent.  Patented Dec. 6, 1910.

Application filed January 28, 1909. Serial No. 474,828.

*To all whom it may concern:*

Be it known that I, REINHOLD HERMAN, a citizen of the United States of America, residing at Crafton, in the county of Allegheny and State of Pennsylvania, have invented certain new and useful Improvements in Transmission Mechanism, of which the following is a specification, reference being had therein to the accompanying drawing.

My invention relates to improvements in transmission mechanism and has particular relation to mechanism for operatively connecting the motor to the driven shaft through speed changing mechanism.

In devices of this type now in general use for this purpose, it is the practice to place the transmission or change speed mechanism intermediate the motor and the beveled gear which operates the drive shaft; this construction is disadvantageous by reason of the fact that the friction and stress placed on the beveled gear by the power transmitted through the transmission gearing to the beveled gear varies to such an extent as to produce a rapid wearing out or stripping of the beveled gear connection due to the compounding of the gears in the transmission gearing which results in placing an uneven stress on the beveled gear structure. This will be readily understood from the fact that when the motor is connected direct to the beveled gear of the driven shaft and exerting a power, for instance, equal to 10 horse power, the compounding of the gears of the transmission mechanism increases the power stress on the beveled gear with the exact ratio in which the gears are compounded, so that the constant changing of the mechanism in use produces the variations in stress and strain on the beveled gear structure carried by the driven shaft.

The present invention eliminates this disadvantage and by providing a structure in which the drive connection from the motor to the beveled gear is maintained at a constant pressure, the compounding factor presented by the speed changing mechanism being located between the beveled gear and the driven shaft, the beveled gear structure not being carried by the driven shaft. By this arrangement, the stress and strains presented by the variations in pressure are borne by spur gears which have their teeth located around the periphery and having their faces extending in parallelism with each other, instead of being inclined as where beveled gears are in use.

My invention therefore has for its principal object the provision of a transmission mechanism in which the speed changing structure is located intermediate the beveled gear connection from the motor and the driven or differential shaft.

A further object is to provide a speed changing mechanism in which a floating connector shaft provides the means for engaging any desired series of gears within the mechanism.

A further object of the invention is to provide a speed changing mechanism in which the differential shaft forms one of the elements.

A further object is to provide a speed changing mechanism in which the gears are in constant mesh and in which one set of axially alined gears are mounted to move in unison, the gears co-acting therewith being independently movable, whereby the movement of either one of said set of gears will impart movement to all gears meshing with the entire set.

A further object of the invention is to provide a speed changing mechanism in which the low speed gear carried by the driven shaft forms a driving element for the driven shaft when the direction of movement of the driven shaft is reversed.

A further object of the invention is to provide a structure which carries the differential mechanism and the shafts connected to said differential mechanism, said structure forming the bearings for the shafts and the journals upon which the differential structure is mounted.

A further object is to provide a housing for the differential mechanism, said housing carrying the gears operating the differential and the shafts connected thereto.

A further object is to provide a casing which forms the support for the drive or differential mechanism and for the speed changing mechanism.

Minor objects of the invention are to provide novel mechanism for carrying into effect the general objects referred to.

To these and other ends, the nature of which will be understood as the invention is hereinafter disclosed, my invention consists in the improved construction and combination of parts hereinafter fully described, illustrated in the accompanying drawings, and pointed out in the appended claims.

Referring to the drawings, in which similar reference characters indicate similar parts in each of the views, Figure 1 is a view of the casing shown in Fig. 2, portions of the casing being broken away for the purpose of illustrating the interior mechanism. Fig. 2 is a longitudinal sectional view taken on the line 2—2 of Fig. 1. Fig. 3 is a vertical cross-sectional view taken on the line X—X of Fig. 2, and, Fig. 4 is a detail view of the rack bar and segment for operating the floating shaft.

In the drawings, the drive shaft is designated as A and the driven or differential shaft in which is mounted the differential gearing, is designated as B. The shaft A is positively driven by the motor and is free from any transmission gear structure for changing speed intermediate the point where the shaft enters the casing presently described to this point of connection with the motor. The shaft B is a split or divided shaft as is usual in shafts where a differential mechanism forms a part of the shaft structure, and said shaft B may be connected directly with the parts to be driven, as for instance, the drive wheels of an automobile where the device is employed in automobile structures, or may be connected by chain or other transmission means with the regular drive shaft of such parts, the main feature being to provide within a casing, parts permanently carried by the casing for imparting a direct driving movement to the parts to be driven from the motor shaft.

The construction of the shaft B and the differential gearing mounted therein forms no essential portion of the present invention, any suitable gearing having a shaft extending through and at direct right angles to the plane of the axis of the driven shaft being capable of use with the present device, the drawing showing, in this respect, a conventional form of differential gear structure.

10 designates a casing preferably formed of three sections, $10^a$, $10^b$, and $10^c$, the section $10^a$ providing the support for the gears coöperating with the floating shaft presently described, while the sections $10^b$ and $10^c$, which are substantial duplicates of each other, form bearings for the driven or differential shaft and the gears carried thereby, the three sections being suitably bolted together to form a substantially closed casing to effectively exclude dirt etc.

The section $10^a$ of the casing is formed with a bearing 11 through which the drive shaft A extends, the drive shaft being preferably reduced in diameter at the point where it passes through the bearing 11. The inner end of the drive shaft carries the drive pinion 12, secured thereto in any preferred manner, as by a pin 13 passing through the shaft and the hub of the pinion. The section $10^a$ is provided at its ends with bearings 14 which are in longitudinal alinement, said bearings being adapted to receive the floating shaft 15 which has its axial length extending in a direction at direct right angles to the axis of the drive shaft A. Extending inwardly from the wall of the section $10^a$ are four bearings 16, these bearings having their bearing surfaces arranged concentric with the periphery of the floating shaft 15, said bearings being in axial alinement to provide alined bearing surfaces. The bearings are of any suitable type, being supported from the wall of the section casing $10^a$ in suitable manner as by a web $16^a$, it being understood of course, that the form of the bearing will be such as to permit of the ready insertion of the parts supported thereby.

Mounted within the central bearings 16 is a beveled gear 17, the hub of which is in the form of an open-ended cylinder extending from opposite sides of the gear to provide an elongated portion, the opposite ends of which are mounted within the said bearings 16, the hub being provided with annular collars 18 which serve to prevent axial movement of the hub and gear. The gear 17 is adapted to mesh with the pinion 12 of the drive shaft A. On opposite sides of the hub of the beveled gear 17 and in axial alinement therewith are hubs of gear wheels 19, 20, 21 and 22, said hubs also being cylindrical in form and adapted, when the entire set of gears is interposed, to provide an internal passage-way circular in cross section and extending from one end of the set of gears to the opposite end, the interior of the gears, which forms the outer wall of such passage-way being concentric with the circumference of the floating shaft 15 which extends through such passage-way. The gears 19 and 20, which serve as the intermediate and high speed gears of the speed changing mechanism respectively, are located on one side of the beveled gear 17, while the gear wheels 21 and 22, which respectively serve as the low speed and reversing drive gear of the mechanism are on the opposite side of the gear 17.

The floating shaft 15 is provided with radially extending projecting portions or lugs 23 and $23^a$ arranged circumferentially about the shaft and of a radial length slightly less than the distance between the periphery of the shafts 15 and the normal inner face of the hubs of the gears. The lugs 23 and $23^a$ are spaced apart a distance sufficient to place the planes of the outer edges of the two sets of lugs in substantial alinement with the ends of the hub of the beveled gear 17 when the shaft is placed in such position as to disconnect the gears 17 from the speed changing mechanism. To provide for engagement of the lugs 23 and 23ª with the hub of the gear 17, I provide within said hub radially extending recesses 24, running from one end to the other of the hub, the walls of the recesses forming inwardly-extending portions or lugs between adjacent shaft lugs, said inwardly extending portion having a radial length slightly less than the distance between the periphery of the shaft 15 and the normal inner face (the larger inner diameter) of the hub of said gear. This construction provides a connection for the gears 17 and shaft 15 which prevents any relative movement pivotally, without actual contact of said gear and the shaft, excepting such as may be provided by the sides of the lugs and the side walls of the recesses 24 of the hub, there being no actual radial connection of these parts. And since said recesses extend from end to end of the gear 17, the shaft 15 is permitted free movement axially of the hub without liability of disengagement of said parts.

Each of the gears 19, 20, 21 and 22 are provided with similar recesses 24, said recesses however, being of less length than the axial length of the hub of its gear, thereby providing in each hub a portion which will co-act with said lugs and a circumferential space within which said lugs may be freely rotated without engaging the gear within which such lug may be located. The recesses 24 of the gears are located on the side of the hub in close proximity to the hub of the gears 17. By this construction, it will be seen that, with the drive shaft A constantly rotating under the action of the motor, the pinion 12 will impart a constant movement to the gear 17. If the floating shaft 15 be positioned in the mechanism as shown in Fig. 2 of the drawings, the lugs 23 and 23ª will lie entirely within the planes of the ends of the hub of said gear 17, with the result that the constant movement of the gear 17 will impart a similar movement to the shaft 15, but since no connection with either of the other gears is had when in this position, the remaining gears will not be driven and therefore remain idle. If however, the floating shaft be moved to the right in Fig. 2, a distance sufficient to cause the lugs 23ª to enter into engagement with the recessed portions of the gear 21, said gear 21 will be positively driven by reason of the fact that the lugs 23 remain in operative engagement with the recessed portions of the gear 17. If the movement of the shaft 15 be continued a distance sufficient to cause the recessed portions of gear 22 to be engaged by the lugs 23ª, a similar result will be obtained due to the fact that the lugs 23 would still remain in operative engagement with the gear 17, the gear 21 not being in operative engagement with either set of lugs when in this position. It will be understood, of course, that when the lugs 23 pass into the non-recessed portions of the gear 21, no drive connection is had between the gear 17 and gear 21. It will be readily understood that if the shaft 15 be moved axially in the opposite direction, the lugs 23 will form the drive members for the gears 19 and 20 while the lugs 23ª will remain in operative connection with the gear 17. It will therefore be understood that the movements of the shaft 15 are such as to practically provide a permanent connection between the shaft 15 and gear 17, regardless of which gear may be operated by the gear 17.

The sections 10ᵇ and 10ᶜ of the casing are each provided with bearings 25 extending inwardly and within which are mounted the ends of the differential-carrying frame now to be described, said sections also having outwardly cylindrical portions 26 carrying the casing 27 for the driven or differential shaft B. The differential-carrying frame is substantially of the form shown in section in Fig. 2 of the drawings, being preferably shell-like in structure and having at spaced intervals inwardly extending portions forming bearings for the driven shaft B, said frame therefore serving as a journal for positioning the shafts and differential within the casing and also as a journal to support the shaft and differential relative to the carrying frame. The differential-carrying frame designated at 28, has its intermediate portion formed to receive the shaft and the differential gears, and also is provided, either as an integral structure therewith, or, if desired by being bolted or otherwise secured thereto with gears 29, 30, and 31, the gear 29 meshing with the gear 19, the gear 30 meshing with the gear 20, and gear 31 meshing with gear 21. Said gear 31 as shown in Fig. 3 also meshes with a pinion 32 carried by a shaft 33, on which latter shaft is mounted a gear 34 which meshes with gear 22, this latter construction providing for reversal of movement of the driven shaft.

It will now be understood that when the lugs 23 and 23ª are in the position shown in Fig. 2, no portion of the mechanism will be driven excepting the gear 17 and shaft 15. If the shaft 15 be now moved so as to cause engagement of lugs 23ª with the gear 21, the drive connection will be from gear 17 to shaft 15, through gear 21 to gear 31, which latter, being connected to the differential shaft B, will cause said shaft to be driven at the "low" speed. If it desired at this time to reverse, the shaft 15 is moved to bring the lugs 23ª into engagement with the gear 22, releasing engagement of gear 21 and the shaft and providing the driving connections through gear 22, gear 34, pinion 32 to the gear 31, the latter gear in this case rotating in the opposite direction and thereby imparting a reverse movement to the driven shaft.

When the high speed or the intermediate speed is desired to be brought into operation, the shaft is moved to bring the lugs 23 into operative engagement with the gears 20 or 19 and through the gears of the frame 28 meshing therewith causing the driven shaft to have its movement at the desired speed, the relative sizes of the gears, of course, controlling the speed.

It will be understood that while but one of the gears 19, 20, 21 or 22 may be brought into action as a drive member through the lugs 23 or 23ª, each of said gears will be rotated, said rotation, however, being at different speeds according to the respective sizes of the gears, this being due to the fact that the gears carried by the frame 28 move as a unitary structure. And although the gears are each moving, this fact will not prevent the shaft and the gear from being moved into drive connection with any of the other gears.

To provide movements of the shaft 15 in directions to permit engagement of the lugs 23 and 23ª with the recessed portions of the gears, I provide a frame 36, the ends of which are located in axial alinement with the shaft 15, said shaft being mounted in a manner to permit a rotative movement of the shaft relative to such ends. The intermediate portion of the frame is mounted to slide in suitable brackets 37 carried by the section 10ª of the casing, and has its upper face formed as a rack adapted to co-act with the sector 38 pivotally mounted on a bracket 39 carried by the casing, said sector 38 having a handle 40, by means of which the sector may be moved on its pivot, thereby providing means for moving the shaft 15 axially. To control the length of movement of the handle 40, I provide a suitable segment 41 having notches 42 to receive a latch 43 carried by the handle.

It will be readily understood that the bearing for the shaft A may be located at a different point from that shown in Fig. 3, the particular point on the section 10ª at which the bearing may be located being dependent upon the point at which it is desired that the structure may be held relative to the direction of length of the shaft A. For instance, the bearing may be formed at a point in which the shaft A extends in a direction at direct right angles to that shown in Fig. 3, the bearing in this case being located at the right of section 10ª as shown in Fig. 3, the mounting of the frame 36 and the parts for operating said frame being modified accordingly to permit the connection to be made at this point, such modified construction permitting of a change of angularity of the direction of length of the drive shaft relative to the mechanism. It will also be understood that the particular construction and operation of the floating shaft may be modified. For instance, said shaft may be divided and each portion of the shaft have independent operating mechanism for positioning the lugs carried thereby relative to the gears and form what may be known in the automobile trade as the "select type of transmission."

The advantages of this construction will be readily understood; among these are the following: the fact that there is a single element, the floating shaft, which is required to be moved to provide the necessary drive connections; the fact that the power pressure brought to bear on the pinion 12 and beveled gear 17 remains unchanged regardless of the compounding effect produced by the changes in speed; the fact that the entire speed changing mechanism is contained within a casing carrying the driven shaft and differential, and the durability in construction, simplicity in operation, a minimum number of parts, the elimination of non-connected divided shafts together with the elimination of counter shafts; the fact that the movements of the gears are confined entirely to movements in a rotative direction; the fact that one of the sets of gears moves as a unitary structure requiring no adjusting connection for bringing any one of said gears into operation; and the fact that the gear carrier for one of the sets of gears forms the support for the driven shaft and differential.

While I have herein shown and described the preferred form of construction and arrangement of parts for producing the desired results, I desire it to be understood that I do not limit myself to such details of construction and arrangement of parts as indicated, but reserve the right to use any and all of such modifications thereof as may be found desirable in so far as such changes and modifications may fall within the spirit and scope of the invention, as set forth in the claims.

Having thus described my invention, what I claim as new is:—

1. In power transmission mechanism, a housing, a driven shaft within said housing, a plurality of connected gears journaled in said housing, a differential mechanism intermediate said shaft and connected gears, loose gears in permanent mesh with said connected gears, a drive shaft extending into said housing, a drive gear in permanent drive connection with said drive shaft and axially alined with said loose gears, and means non-supported by the drive and loose gears and located in permanent drive engagement with said drive gear and movable axially of said loose gears for connecting the drive gear with either loose gear at will.

2. In power transmission mechanism, a housing, a driven shaft within said housing, a plurality of connected gears journaled in said housing, a differential mechanism intermediate said shaft and connected gears, loose gears in permanent mesh with said connected gears, a drive shaft extending into said housing, a drive gear in permanent drive connection with said drive shaft and axially alined with said loose gears, and means non-supported by the drive and loose gears and located in permanent drive engagement with said drive gear and movable axially of said loose gears for connecting the drive gear with either loose gear at will, said means extending in parallelism with the driven shaft.

3. In power transmission mechanism, a housing, a driven shaft within said housing, a plurality of connected gears journaled in said housing, a differential mechanism intermediate said shaft and connected gears, loose gears in permanent mesh with said connected gears, a drive shaft extending into said housing, a drive gear in permanent drive connection with said drive shaft and axially alined with said loose gears, and means non-supported by the drive and loose gears and located in permanent drive engagement with said drive gear and movable axially of said loose gears for connecting the drive gear with either loose gear at will, said means being independent of either shaft and extending in parallelism with the driven shaft.

4. In power transmission mechanism, a housing, a driven shaft within said housing, a plurality of connected gears journaled in said housing, a differential mechanism intermediate said shaft and connected gears, loose gears in permanent mesh with said connected gears, a drive shaft extending into said housing, a drive gear in permanent drive connection with said drive shaft and axially alined with said loose gears, and means supported wholly by the housing in permanent engagement with said drive gear and movable axially of said loose gears for connecting the drive gear with either loose gear at will.

5. In power transmission mechanism, a housing, a driven shaft within said housing, a plurality of connected gears journaled in said housing, a differential mechanism intermediate said shaft and connected gears, loose gears in permanent mesh with said connected gears, a drive shaft extending into said housing, a drive gear in permanent drive connection with said drive shaft and axially alined with said loose gears, and a floating member supported wholly by the housing and extending axially of said alined gears, said member being in permanent engagement with said drive gear and movable longitudinally to connect said drive gear with either loose gear at will.

6. In power transmission mechanism, a housing, a driven shaft within said housing, a plurality of connected gears journaled in said housing, a differential mechanism intermediate said shaft and connected gears, loose gears in permanent mesh with said connected gears, a drive shaft extending into said housing, a drive gear in permanent drive connection with said drive shaft and axially alined with said loose gears, and a floating member supported wholly by the housing and extending axially of said alined gears, said member being in permanent engagement with said drive gear and movable longitudinally to connect said drive gear with either loose gear at will, said member extending in parallelism with the driven shaft.

7. In power transmission mechanism, a housing, a driven shaft within said housing, a plurality of connected gears journaled in said housing, a differential mechanism intermediate said shaft and connected gears, loose gears in permanent mesh with said connected gears, a drive shaft extending into said housing, a drive gear in permanent drive connection with said drive shaft and axially alined with said loose gears, and a floating shaft supported wholly by the housing and extending axially of said alined gears, said shaft being in permanent engagement with said drive gear and movable longitudinally to connect said drive gear with either loose gear at will, said shaft extending in parallelism with the driven shaft.

8. In power transmission mechanism, a housing, a driven shaft within said housing, a plurality of connected gears journaled in said housing, a differential mechanism intermediate said shaft and connected gears, loose gears in permanent mesh with said connected gears, a drive shaft extending into said housing, a drive gear in permanent drive connection with said drive shaft and axially alined with said loose gears, and a floating shaft supported wholly by the housing and extending axially of said alined gears, said shaft being in permanent engagement with said drive gear and movable longitudinally to connect said drive gear with either loose gear at will, said shaft extending in parallelism with the driven shaft, said shaft and alined gears having complemental configurations to provide the selective connection.

9. In transmission mechanism, a drive shaft, a driven shaft, a housing through which said driven shaft extends, a gear in constant drive connection with the drive shaft and provided with internal ways, a shiftable shaft journaled in said housing, said latter shaft having a constant drive engagement with said gear, loosely-mounted gears in said housing, gears mounted on said driven shaft and with which the loosely-mounted gears are constantly engaged, and means carried by the shiftable shaft to engage with the loosely-mounted gears and impart movement to said drive shaft.

10. In transmission mechanism, a drive shaft, a driven shaft, a housing through which said driven shaft extends, a gear in constant drive connection with the drive shaft and provided with internal ways, a shiftable shaft journaled in said housing, said latter shaft having a constant drive engagement with said gear, gears independently journaled within said housing, gears mounted on said driven shaft and with which the independently-journaled gears are constantly engaged, and means carried by the shiftable shaft to engage with the independently-journaled gears and impart movement to said driven shaft.

11. In combination, a driven shaft, a housing through which said driven shaft extends, and gears on said shaft within the housing, a drive shaft, a gear in the housing in constant engagement with the drive shaft, a shiftable shaft journaled in said housing and in constant drive connection with said gear, independently-journaled gears in the housing in constant mesh with the gears on said driven shaft, means on the shiftable shaft for engagement with the independently-mounted gears at different positions of the shiftable shaft, said shiftable shaft extending beyond the housing at both ends, and shifting means engaging the ends of said shaft.

12. In power transmission mechanism, a driven shaft, a housing through which said driven shaft extends, a differential mechanism, permanently-connected gears on said driven shaft within the housing, independently-journaled gears, a drive shaft in permanent drive connection with one of said independently-journaled gears, a shifting shaft journaled in the housing and having a constant drive engagement with the gear driven from the drive shaft, said shifting shaft having shifting means to select any one of the independently-journaled gears to impart motion through the permanently-connected gears on the driven shaft.

13. In power transmission mechanism, a driven shaft, a housing through which said driven shaft extends, a differential mechanism, permanently-connected gears on said driven shaft within the housing, independently-journaled gears, a drive shaft in permanent drive connection with one of said independently-journaled gears, a shifting shaft journaled in the housing and having a constant drive engagement with the gear driven from the drive shaft, and shifting means for said shifting shaft, said means being movable to select any one of the independently-journaled gears to impart motion through the permanently-connected gears on the driven shaft.

14. Power transmission mechanism comprising a drive shaft, a driven shaft spaced therefrom, permanently-positioned gears movable with said driven shaft, loose gears in permanent mesh and corresponding in number to said driven shaft gears, a loose gear in permanent drive connection with the drive shaft and axially alined with the loose gears, and means permanently-positioned out of contact with either shaft for operatively-connecting either of said loose gears with said alined drive gear, said loose gears being axially alined and each having an axial length sufficient to provide both drive and free rotative movements of said means relative to the gear, said means being movable in directions axially of the loose gears.

15. In power transmission mechanism, a drive shaft, a driven shaft, and drive connections between said shafts, said connections including adjacent alined gears independently rotatable and adapted to provide movements to the driven shaft in opposite directions, a single gear in constant drive connection with the drive shaft, and means in permanent drive connection with said constantly-driven gear and movable to provide drive connections between said gear and the driven shaft through either of said alined gears.

In testimony whereof I affix my signature in the presence of two witnesses.

REINHOLD HERMAN.

Witnesses:
A. M. WILSON,
N. LOUIS BOGAS.